United States Patent
Takayama et al.

(10) Patent No.: US 6,683,643 B1
(45) Date of Patent: Jan. 27, 2004

(54) ELECTRONIC CAMERA CAPABLE OF DETECTING DEFECTIVE PIXEL

(75) Inventors: Jun Takayama, Hachioji (JP); Naruo Takizawa, Hachioji (JP)

(73) Assignee: Konica Minolta Holdings, Inc., Tokyo (JP)

(*) Notice: Subject to any disclaimer, the term of this patent is extended or adjusted under 35 U.S.C. 154(b) by 0 days.

(21) Appl. No.: 09/040,442

(22) Filed: Mar. 18, 1998

(30) Foreign Application Priority Data

Mar. 19, 1997 (JP) .............................................. 9-066293
Nov. 28, 1997 (JP) .............................................. 9-328475

(51) Int. Cl.$^7$ ........................... H04N 9/64; H04N 5/232
(52) U.S. Cl. ....................... 348/247; 348/280; 348/349
(58) Field of Search ................................ 348/207, 222, 348/224, 228, 229, 230, 241, 244–247, 345, 347, 349–351, 362–365, 222.1, 223.1, 224.1, 335, 340, 342, 272, 273, 277, 280

(56) References Cited

U.S. PATENT DOCUMENTS

| | | | | |
|---|---|---|---|---|
| 4,739,495 A | * | 4/1988 | Levine | 348/247 |
| 4,910,598 A | * | 3/1990 | Itakura | 348/247 |
| 5,038,216 A | * | 8/1991 | Easterly | 348/264 |
| 5,144,446 A | * | 9/1992 | Sudo | 348/246 |
| 5,327,246 A | * | 7/1994 | Suzuki | 348/246 |
| 5,396,286 A | * | 3/1995 | Ishizuka | 348/246 |
| 5,416,516 A | * | 5/1995 | Kameyama | 348/247 |
| 5,436,659 A | * | 7/1995 | Vincent | 348/246 |
| 5,754,224 A | * | 5/1998 | Kusaka | 348/241 |
| 6,002,433 A | * | 12/1999 | Watanabe | 348/363 |
| 6,307,393 B1 | * | 10/2001 | Shimura | 348/246 |

* cited by examiner

Primary Examiner—Ngoc-Yen Vu
(74) Attorney, Agent, or Firm—Finnegan, Henderson, Farabow, Garrett & Dunner, L.L.P.

(57) ABSTRACT

Photographing for one image plane is conducted by CCD1 under the completely dark condition created by closing aperture 12 when the power supply is turned on, then image data obtained from this photographing are compared with a threshold value, and when the image data show higher luminance than the threshold value, the image data are detected to be defective pixels (white flaws) and positional information thereof is stored. Further, under the condition that the mode for detecting defective pixels is selected by mode switch 16, photographing for one image plane is conducted by CCD1 while a camera is directed to an exclusive subject, then image data obtained through this photographing are compared with a threshold value, and when the image data show lower luminance than the threshold value, the image data are detected to be defective pixels (black flaws), and positional information thereof is stored. In ordinary photographing, a mean value of peripheral pixels surrounding the image data of the defective pixel is used for replacement based on positional information of the defective pixel.

9 Claims, 11 Drawing Sheets

FIG. 2

| A | C |
|---|---|
| B | D |

FIG. 3

| A |   | A |   | A |   | A |   | A |
|---|---|---|---|---|---|---|---|---|
|   |   |   |   |   |   |   |   |   |
| A |   | A |   | A |   | A |   | A |
|   |   |   |   |   |   |   |   |   |
| A |   | A |   | AA |   | A |   | A |
|   |   |   |   |   |   |   |   |   |
| A |   | A |   | A |   | A |   | A |
|   |   |   |   |   |   |   |   |   |
| A |   | A |   | A |   | A |   | A |

FIG. 4

| B | B | B | B | B |
|---|---|---|---|---|
| B | B | B | B | B |
| B | B | BB | B | B |
| B | B | B | B | B |
| B | B | B | B | B |

FIG. 5

|     | n-2 | n-1 | n | n+1 | n+2 |
|-----|-----|-----|---|-----|-----|
| n-2 | A | B | A | B | A |
| n-1 | C | D | C | D | C |
| n   | A | B | A | B | A |
| n+1 | C | D | C | D | C |
| n+2 | A | B | A | B | A |
| n+3 | C | D | C | D | C |

FIG. 6

|     | n-1 | n | n+1 | n+2 |
|-----|-----|---|-----|-----|
| n-1 | A | B | A | B |
| n   | C | A | C | A |
| n+1 | A | B | A | B |
| n+2 | C | A | C | A |
| n+3 | A | B | A | B |

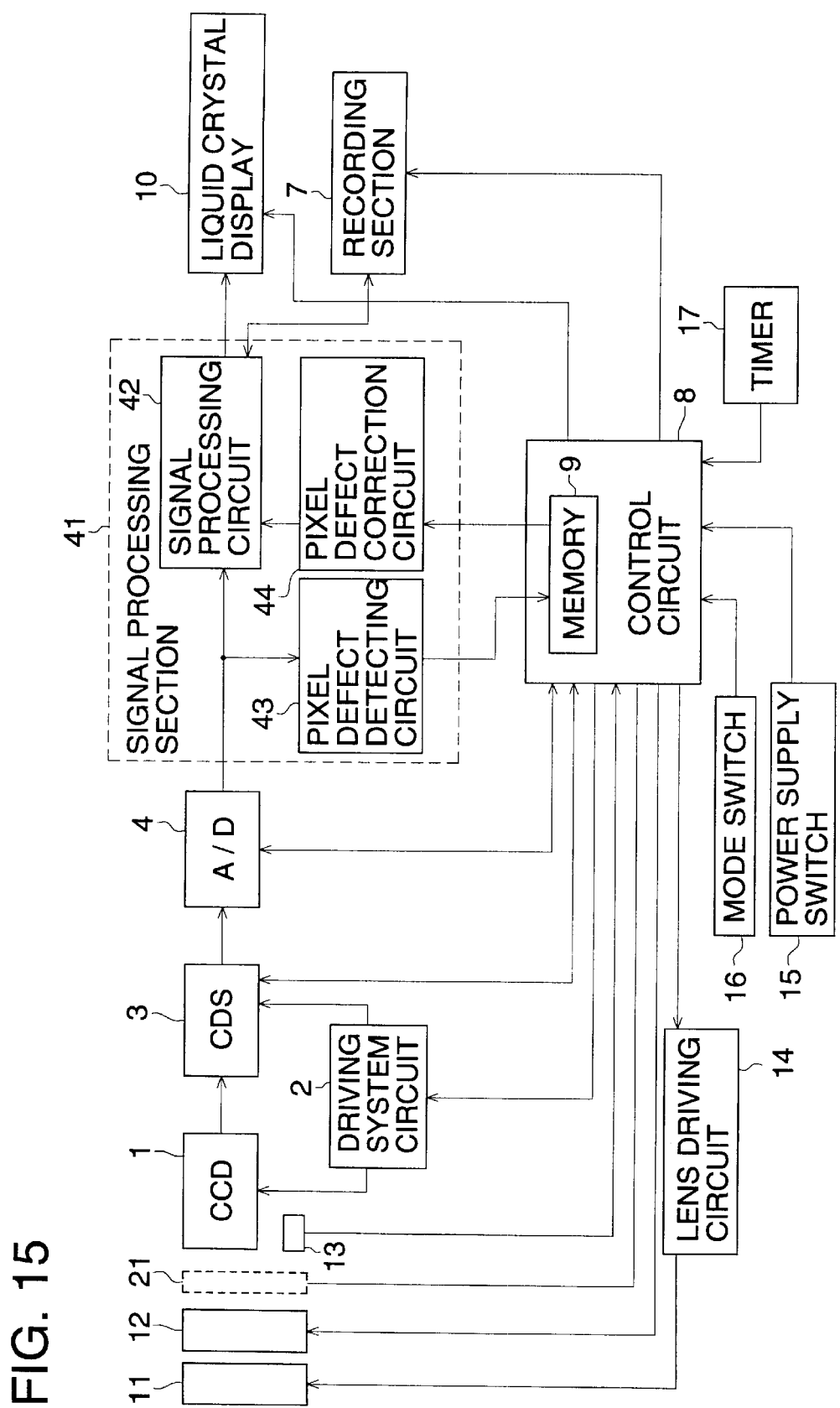

ELECTRONIC CAMERA CAPABLE OF DETECTING DEFECTIVE PIXEL

BACKGROUND OF THE INVENTION

The present invention relates to a technology which detects, in an electronic camera equipped with a solid image pickup element, a defective pixel of the solid image pickup element, and corrects output signals from the defective pixel.

A solid image pickup element equipped in an electronic camera has a function to convert, with many pixels arranged two-dimensionally, optical images of a subject formed on the pixel into an amount of electric charges (electric signals), and to output them. Among these pixels, incidentally, there can be some pixels which can not output normal signals due to the defects (pixel defects) based on dust adhesion and crystal defects. These pixel defects are represented by both a white flaw wherein signals in which excessive signal components are added to output signals which are supposed to be outputted in accordance with luminance of a subject are outputted accidentally to make an image to be whitish, and a black flaw wherein signals in which certain signal components are subtracted from output signals which are supposed to be outputted in accordance with luminance of a subject are outputted accidentally to make an image to be blackish.

When there are caused much pixel defects, it is apprehended that image quality is deteriorated badly, when reproducing images which are picked up by the use of the solid image pickup element having that pixel defects. On the other hand, with regard to the solid image pickup element having therein at least hundreds of thousands of pixels or more which has recently come to be used, it is actually difficult to manufacture the solid image pickup element which is free from pixel defects. It is therefore required to use the solid image pickup element on the assumption that pixel defects to a certain extent always exist.

There has already been developed an electronic camera which is equipped with a correction circuit which corrects, through post-processing, the electric signals outputted from the pixel having pixel defects to improve image quality, based on the assumption mentioned above. The electronic camera stated above employs a method wherein a pixel having pixel defects (defect pixel) in the solid image pickup element is detected by the use of a pixel defect inspecting instrument on the occasion of factory shipments of the electronic camera, and a position thereof is stored in a ROM accompanying the electronic camera, for example, as information, whereby signals outputted from the defect pixel are corrected properly in the case of actual photographing.

However, it was found that the white flaw stated above is sometimes increased in accordance with aging deterioration or environmental conditions where the solid image pickup element is used, because it is a pixel defect based on a crystal defect. For example, the white flaw tends to be increased when the temperature surrounding the solid image pickup element is raised, or when the exposure time is long. In such a case, another defect pixel is caused at a position which is different from the position of the defect pixel detected under a prescribed condition on the occasion of factory shipments, which sometimes makes it impossible to correct sufficiently. Therefore, it is also possible to consider a method wherein exposure for a long time or exposure at high temperature is conducted to obtain defect pixel information, and signals from the defect pixel are always corrected based on the aforesaid information.

However, the white flaw caused by the exposure for a long time is one which is not caused by exposure for a short time, and it is not preferable to conduct correction processing at all times with regard to the white flaw, because the correction processing delays the processing time. Further, since the pixel causing a white flaw under exposure for a long time can function as a normal pixel in the course of ordinary photographing, it is apprehended that correction for the normal output signals from that pixel may rather deteriorate image quality.

In particular, a digital camera is in a tendency that the number of pixels of a solid image pickup element is increased for improvement of image quality, and this tendency of increase of the number of pixels has created a tendency that the number of defect pixels is naturally increased and the number of occurrence of another white flaw caused by aging change is increased in proportion to the increase of the number of pixels. Therefore, in a digital camera having many pixels of the solid image pickup element, the defect pixel stated above matters much especially, and a technology to cope with aging change of the defect pixel in the market place has been desired.

SUMMARY OF THE INVENTION

The invention has been achieved in view of the problems stated above, and its object is to provide an electronic camera which can cope with aging changees of defective pixels of a solid image pickup element and can detect the defect pixels accurately. Further object of the invention is to provide an electronic camera which can properly correct white flaws the number of which depends on a length of time of exposure, a pixel signal correcting method and a recording medium.

The objects mentioned above can be attained by the structures or methods described in each item below.

Item 1

An electronic camera equipped with a solid image pickup element wherein an image for detecting pixel defects is subjected to image pickup, and image data of each pixel of the solid image pickup element obtained through the image pickup is compared with reference image data respectively to detect defect pixels in the solid image pickup element.

In the structure mentioned above, an image suitable for detecting pixel defects is photographed for image pickup by an electronic camera, and image data of each pixel of the solid image pickup element obtained through the image pickup are compared with image data representing a reference to detect defect pixels for each image pickup of the image for detecting pixel defects.

Item 2

The image data representing a reference is assumed to be the value stored in advance.

In the structure, the reference image data for judging whether image data are normal or abnormal in accordance with the image for detecting pixel defects are stored in advance, and image data obtained through image pickup of the image for detecting pixel defects are compared with the reference image data for each pixel, whereby the image data are judged whether they are normal or abnormal for each pixel.

Item 3

The reference image data are operated based on image data in a prescribed area which includes a targeted pixel.

In the aforesaid structure, a defect pixel is detected by judging whether or not the targeted pixel is outputting image data which are on the same level as in the normal pixel, with the image data around the targeted pixel which are assumed to be image data obtained by the normal pixel.

Item 4

Color filters respectively for plural different colors are provided on the solid image pickup element, and the reference image data stated above are represented by a mean value of image data of the pixel on which a color filter having the same color as in the targeted pixel in the prescribed area is provided.

According to the aforesaid structure, in an electronic camera having the structure wherein each pixel is provided with each of color filters respectively for R, G and B and image pickup for a color image is conducted, a mean value of image data of the pixel which is located around the targeted pixel for judging the defect pixel and is provided with a filter having the same color as in the targeted pixel is calculated as image data in the normal pixel, and this calculated value is compared with image data of the targeted pixel to judge whether the image data of the targeted pixel are normal or abnormal.

Item 5

A prescribed area including the targeted pixel is assumed to be a prescribed area in which the targeted pixel is centered.

In the structure stated above, a mean value of image data of the pixel which is provided with a filter having the same color as in the targeted pixel is obtained in the image area in which the targeted pixel is centered for each targeted pixel, and this obtained value is regarded as a normal value to detect defect pixels.

Item 6

Image data obtained through image pickup of the image for detecting pixel defects are split into plural blocks, and each split block is made to be a prescribed area including the targeted pixel.

In the structure stated above, results of image pickup are split into plural blocks with a pixels x b pixels serving as a unit, for example, then, a mean value is obtained for each same filter color for each block, and this mean value is compared with the image data of the targeted pixel. Therefore, with regard to the targeted pixel in the same block, detection of defect pixels is conducted by the use of the same mean value.

Item 7

From the mean value stated above and image data of the targeted pixel, contrast of the targeted pixel is obtained, and the contrast is compared with the prescribed threshold value to detect a defect pixel.

In the structure stated above, image data of the targeted pixel are judged whether they are normal or abnormal based on the level of the contrast for pixels located around the targeted pixel and thereby, the targeted pixel is judged whether it is a defective pixel or not.

Item 8

A difference between the mean value and image data of the targeted pixel is obtained, and the difference is compared with the prescribed threshold value to detect a defective pixel.

In the structure stated above, when the difference between image data of the targeted pixel and average image data of surrounding pixels is great, the image data of the targeted pixel are judged to be abnormal, and thereby the targeted pixel is detected to be a defective pixel.

Item 9

Image data obtained through image pickup of the image for detecting pixel defects are divided into plural blocks, then a mean value of image data is obtained for each color of color filters in the divided block, and a contrast between image data of the targeted pixel and the aforesaid mean value for the same color obtained in the block containing therein the targeted pixel is obtained, and then the contrast is compared with the prescribed threshold value to detect a suspected defective pixel. While in the prescribed area wherein the suspected defective pixel thus detected is centered, a mean value of image data of a pixel provided with a color filter which is the same as that for the aforesaid suspected pixel, and a difference between the mean value and the image data of the targeted pixel is obtained to compare the difference with the prescribed threshold value for detecting a defective pixel.

In the structure stated above, the pixel area is first divided into plural blocks, and a mean value of image data corresponding to the same color filter is obtained for each block. Then a contrast between the mean value and image data of the targeted pixel is calculated, and a suspected defective pixel is detected based on the contrast. Next, in the prescribed area wherein the defective pixel detected as a suspected one is centered, a mean value of pixels of the same color is obtained, and a difference between the mean value and image data of the suspected pixel is calculated to judge whether the pixel detected as the suspected one is a defective pixel or not, based on the difference.

In the same block, in this case, the same mean value is used to judge whether the targeted pixel is a defective pixel or not. Therefore, it is not necessary to obtain a mean value of peripheral pixels for each targeted pixel in detection of a suspected defective pixel. Further, calculation of a mean value in an area where the targeted pixel is centered is limited to the pixel which has been detected as a suspected defective pixel.

Item 10

In the course of image pickup of the image for detecting the pixel defects, there is conducted defocus control which deviates a focus forcibly from the focused position.

In the structure mentioned above, fine flaws or shadows on an image for detecting the pixel defects are vignetted by the defocus control.

Item 11

A diffusing plate which diffuses incident-light in the solid image pickup element is provided to conduct image pickup of the image for detecting the pixel defects.

In the structure mentioned above, light is diffused by the diffusing plate, and the solid image pickup element is illuminated uniformly with light.

Item 12

When conducting image pickup of the image for detecting pixel defects, an aperture and/or shutter speed is adjusted so that luminance of the image picked up may be within a prescribed range.

In the structure stated above, image data wherein a contrast for a black flaw is sufficiently great can be obtained even when luminance of the image for detecting pixel defects is low, and when luminance of the image for detecting pixel defects is too high, in contrast with the foregoing, image data wherein a contrast for a white flaw can sufficiently be secured can be obtained.

Item 13

The image for detecting pixel defects is subjected to image pickup plural times, and a defective pixel is detected from the results of plural implementation of image pickup.

In the structure stated above, a defective pixel is not specified only from the results of one implementation of image pickup, for example, but the final defective pixel (including a suspected defective pixel) is detected when the defective pixel is detected from the results of prescribed number or more of implementation of image pickup, for example, among results of plural number of implementation of image pickup.

Item 14

The image for detecting pixel defects is subjected to image pickup plural times, and a defective pixel is detected based on images wherein the images obtained from image pickup for plural times are superposed.

In the structure stated above, the image for detecting pixel defects is subjected to image pickup plural times, and image data obtained from the foregoing are added for each pixel, and a defective pixel is detected based on the image data of the results of the addition.

Item 15

Incident-light into the solid image pickup element is intercepted, and a dark image in this case is subjected to image pickup as an image for detecting pixel defects.

In the structure stated above, Incident-light into the solid image pickup element is intercepted through adjustment of an aperture, and a dark image under this condition is subjected to image pickup, and detection of a white flaw is conducted in a way wherein image data of normal pixels are made to be on the same level as that of the minimum luminance level.

Item 16

The image for detecting pixel defects is subjected to image pickup when turning on a power supply switch, and whereby a defective pixel is detected.

In the structure stated above, an image for detecting pixel defects (for example, a dark image) is automatically subjected to image pickup for each turning on of a power supply switch, so that a defective pixel is detected.

Item 17

A temperature of the solid image pickup element is detected, and the image for detecting pixel defects is subjected to image pickup when the detected temperature is not lower than the prescribed temperature so that a defective pixel is detected.

In the structure stated above, temperature rise of the solid image pickup element which causes a change in increase of white flaws is detected, and when the temperature rise is observed the image for detecting pixel defects is subjected to image pickup so that a defective pixel is detected.

Item 18

The image for detecting pixel defects is subjected to image pickup at a prescribed interval so that a defective pixel is detected.

In the structure stated above, the image for detecting pixel defects is subjected to image pickup at a prescribed interval, such as, monthly, semiannually, or yearly, for example, so that a defective pixel is detected.

Item 19

A position of the defective pixel detected is stored, and image data of the defective pixel are corrected based on information of the position of the defective pixel.

In the structure stated above, image data outputted corresponding to the defective pixel are corrected based on information of the position of the defective pixel which is updated for each image pickup of the image for detecting pixel defects, and abnormal image data caused by the defective pixel are compensated.

Item 20

The aforesaid correction is made by replacing image data of a pixel adjoining the detected defective pixel with image data of the defective pixel.

In the structure stated above, image data which are close to image data corresponding to the defective pixel are frequently obtained in a normal pixel that adjoins the defective pixel. Therefore, image data of the defective pixel are not used as they are, but they are replaced with image data of the aforesaid adjoining pixel.

Item 21

The solid image pickup element mentioned above is provided with plural filters each being of a different color, and the aforesaid correction is made by replacing image data of the defective pixel with a mean value of image data of peripheral pixels each being provided with a color filter identical to that for the detected defective pixel.

In the structure stated above, a mean value of the pixels surrounding the defective pixel approximates stably to image data corresponding to the defective pixel. Therefore, image data of the defective pixel are replaced with the mean value.

Item 22

There is provided a mode selecting means which selects between a mode for image pickup of the image for detecting pixel defects and a mode for detection of a defective pixel.

In the structure stated above, when a mode to detect the defective pixel is designated through the mode selection conducted by the mode selecting means, detection of the defective pixel is carried out by regarding the image obtained after image pickup as an image for detecting pixel defects.

Item 23

An electronic camera equipped with a solid image pickup element wherein there are provided a control means which controls the solid image pickup element so that an image for detecting pixel defects may be photographed by one image plane, a pixel defect detecting means which detects pixel defects by comparing a signal level of electric signals for one image plane outputted from the solid image pickup element with a prescribed threshold value for each pixel, a rewritable storing means which stores information of the position for detection of pixel defects, and a pixel defect correcting means which corrects the signal level of the position for detection of the pixel defects to the prescribed level.

In the structure stated above, the solid image pickup element controlled by the control means, and an image for detecting pixel defects is photographed by one image plane. The signal level of electric signals for each one image plane outputted from the solid image pickup element is compared with the prescribed threshold value for each pixel by the pixel defect detecting means. When there are pixel defects, the pixel defects are detected by comparing the signal level with the prescribed threshold value for each pixel, because the signal level for the pixel defects is greatly different from the signal level of other pixels when they are compared. When the pixel defects are detected, information of the position for detection of the pixel defects is stored in the rewritable storing means. Then, based on this positional information, the pixel defect correcting means corrects the signal level of the position for detection of the pixel defects to the prescribed level. The storing means which is rewritable and the pixel defect detecting means which is provided as stated above make it possible to detect pixel defects not only at the time of factory shipments but also at any time.

Item 24

While a light quantity adjusting means which adjusts light quantity of the solid image pickup element is provided, the control means controls the light quantity adjusting means so that light quantity may be zero when detecting white flaws as pixel defects, and the pixel defect detecting means compares a signal level of electric signals outputted from the solid image pickup element with the prescribed threshold value for detecting white flaws.

In the structure stated above, when detecting white flaws as a defective pixel, the light quantity adjusting means is controlled by the control means, and light quantity of the solid image pickup element is adjusted so that it may become zero. Then the electric signal of the solid image pickup element is compared with the prescribed threshold value for detecting white flaws, whereby the white flaws are detected.

Item 25

An electronic camera is provided with a solid image pickup element having plural pixels, a storing means which stores information of defective pixels of the solid image pickup element corresponding to exposure time, and a determining means which determines defective pixels based on information of the exposure time in the course of photographing and information of the defective pixels.

Item 26

An electronic camera is provided with a solid image pickup element having plural pixels, a storing means which stores information of defective pixels of the solid image pickup element corresponding to temperature of the solid image pickup element, and a determining means which determines defective pixels based on information of the temperature of the solid image pickup element in the course of photographing and information of the defective pixels.

Item 27

A pixel signal correcting method includes therein a step to determine defective pixels in the course of image pickup based on both information of defective pixels corresponding to the exposure time relating to a solid image pickup element having therein plural pixels and information of exposure time in the course of image pickup, and a step to correct the signals outputted from the determined defective pixels.

Item 28

A pixel signal correcting method includes therein a step to determine defective pixels in the course of image pickup based on both information of defective pixels corresponding to the exposure time relating to a solid image pickup element having therein plural pixels and information of temperature of the solid image pickup element in the course of image pickup, and a step to correct the output signals from the determined defective pixels.

Item 29

A pixel signal correcting method includes therein a step to obtain information of defective pixels corresponding to each exposure time by conducting image pickup with a solid image pickup element having therein plural pixels while changing exposure time, a step to determine defective pixels in the course of image pickup based on both information of exposure time in the course of image pickup and information of the defective pixels determined, and a step to correct the output signals from the defective pixels determined.

The structure described in Item 1 makes it possible to detect defective pixels which are caused after changes with time, because defective pixels (white flaws and black flaws) of the solid image pickup element can be detected based on results of photographing with an electronic camera.

The structure described in Item 2 makes it possible to detect, through a simple structure, the black flaws and white flaws which output signals extremely different from output of normal pixels.

The structure described in Item 3 makes it possible to detect defective pixels without being affected by dispersion of images, by discriminating image data using the standard corresponding to the image obtained through photographing.

The structure described in Item 4 makes it possible to detect defective pixels without being affected by a difference of luminance caused by a difference of a color, in an electronic camera wherein plural color filters each being of a different color are provided on a solid image pickup element for color photographing.

The structure described in Item 5 makes it possible to judge accurately whether pixels are defective or not with image data within an area where the targeted pixel is centered.

The structure described in Item 6 makes it unnecessary to calculate the reference image data for each targeted pixel and thereby to lighten a burden of calculation.

The structure described in Item 7 makes it possible to judge defective pixels through a difference of output levels while taking the level of image data of surrounding pixels into consideration.

The structure described in Item 8 makes it possible to detect defective pixels simply based on a difference of output levels caused by pixel defects.

The structure described in Item 9 makes it possible to lighten a burden of calculation by making calculation of reference image data to be unnecessary for each targeted pixel, and thereby to finally judge accurately whether a pixel is defective or not, using the reference of image data in a pixel area where the targeted pixel is centered.

The structure described in Item 10 makes it possible to avoid that defective pixels are affected by flaws and shades of a subject and thereby are detected erroneously.

The structure described in Item 11 makes it possible to detect defective pixels from results of photographing without limiting a subject in detail.

The structure described in Item 12 makes it possible to secure a contrast between image data of defective pixels and peripheral pixels without being affected by dispersion of subjects and thereby to improve detection accuracy.

The structures described in Items 13 and 14 make it possible to avoid that defective pixels are affected by noise and thereby are detected erroneously.

The structure described in Item 15 makes it possible to detect white flaws simply and accurately through photographing of a dark image.

The structure described in Item 16 makes it possible to detect white flaws automatically each time the power supply is turned on, and thereby to detect surely the state of the white flaws before photographing.

The structure described in Item 17 makes it possible to detect changes of increase in white flaws caused by temperature rise of the solid image pickup element.

In the structure described in Item 18, detection of white flaws is conducted at prescribed intervals and thereby it is possible to learn clearly changes with time for the white flaws.

The structure described in Item 19 makes it possible to avoid that image quality of a photographed image is lowered sharply by existence of defective pixels.

The structures described in Items 20 and 21 make it possible to correct to the value which is close to the data which should be obtained originally as image data of a defective pixel.

The structure described in Item 22 makes it possible to conduct detection of defective pixels at any time.

The structure described in Item 23 makes it possible to conduct correction of pixel defects corresponding to changes with time of the solid image pickup element, thereby to utilize even an image pickup element having pixel defects slightly, and thereby to achieve cost reduction.

The structure described in Item 24 makes it possible to avoid deterioration of image quality caused by white flaws by detecting white flaws highly accurately and by correcting image data for the portion of the detected white flaws.

The electronic camera with the structure described in Item 25 having therein a solid image pickup element having plural pixels, a storing means which stores information of defective pixels of the solid image pickup element corresponding to exposure time and a determining means which determines defective pixels based on information of exposure time in photographing and information of the defective pixels, makes it possible reduce the number of defective pixels determined by the determining means when the exposure time is short, for example, and thereby to conduct quickly correction processing for output signals. On the other hand, when the exposure time is long, it is possible to enhance the number of defective pixels determined by the determining means to the necessary level, and thereby to improve image quality.

The electronic camera with the structure described in Item 26 having therein a solid image pickup element having plural pixels, a storing means which stores information of defective pixels of the solid image pickup element corresponding to temperature of the solid image pickup element and a determining means which determines defective pixels based on information of temperature of the solid image pickup element in photographing and information of the defective pixels, makes it possible reduce the number of defective pixels determined by the determining means when the temperature of the solid image pickup element is low, and thereby to conduct quickly correction processing for output signals. On the other hand, when the temperature of the solid image pickup element is high, it is possible to enhance the number of defective pixels determined by the determining means to the necessary level, and thereby to improve image quality.

A pixel signal correcting method described in Item 27 having therein a step to determine defective pixels in the course of image pickup based on both information of defective pixels corresponding to the exposure time relating to a solid image pickup element having therein plural pixels and information of exposure time in the course of image pickup, and a step to correct the output signals from the determined defective pixels, makes it possible to reduce the number of defective pixels when the exposure time is short, for example, and thereby to conduct quickly correction processing for output signals. When the exposure time is long, on the other hand, it is possible to enhance the number of defective pixels to the necessary level, and thereby to improve image quality.

A pixel signal correcting method described in Item 27 having therein a step to determine defective pixels in the course of image pickup based on both information of defective pixels corresponding to the exposure time relating to a solid image pickup element having therein plural pixels and information of temperature of the solid image pickup element in the course of image pickup, and a step to correct the output signals from the determined defective pixels, makes it possible to reduce the number of defective pixels when the temperature of the solid image pickup element is low, for example, and thereby to conduct quickly correction processing for output signals. When the temperature of the solid image pickup element is high, on the other hand, it is possible to enhance the number of defective pixels to the necessary level, and thereby to improve image quality.

A pixel signal correcting method described in Item 29 having therein a step to obtain information of defective pixels corresponding to each exposure time by photographing while changing exposure time with a solid image pickup element having plural pixels, a step to determine defective pixels in the course of image pickup based on information of exposure time in the course of image pickup and information of the obtained defective pixels, and a step to correct the output signals from the determined defective pixels, makes it possible, when the number of defective pixels varies depending on the length of exposure time, to improve image quality while securing quick correction processing of output signals by increasing or decreasing the number of defective pixels whose output signals are to be corrected, in accordance with exposure time.

BRIEF DESCRIPTION OF THE DRAWINGS

FIG. 2 is a diagram showing an example of filters for four colors.

FIG. 3 is a diagram showing the state wherein filters shown in FIG. 2 are arranged two-dimensionally.

FIG. 4 is a diagram showing the state wherein monochromatic filters are arranged.

FIG. 5 is a diagram for explaining how image data of defective pixels are corrected.

FIG. 6 is a diagram for explaining how image data of defective pixels are corrected.

FIGS. 7(a) to 7(c) are diagrams for explaining how image data of defective pixels are corrected in the case of 3-plate type CCD.

FIG. 15 is a system block diagram showing a digital still camera in the fourth embodiment, which is the same as in FIG. 14.

DETAILED DESCRIPTION OF THE PREFERRED EMBODIMENT

Embodiment of the invention will be explained as follows with reference to drawings.

Figure 1:
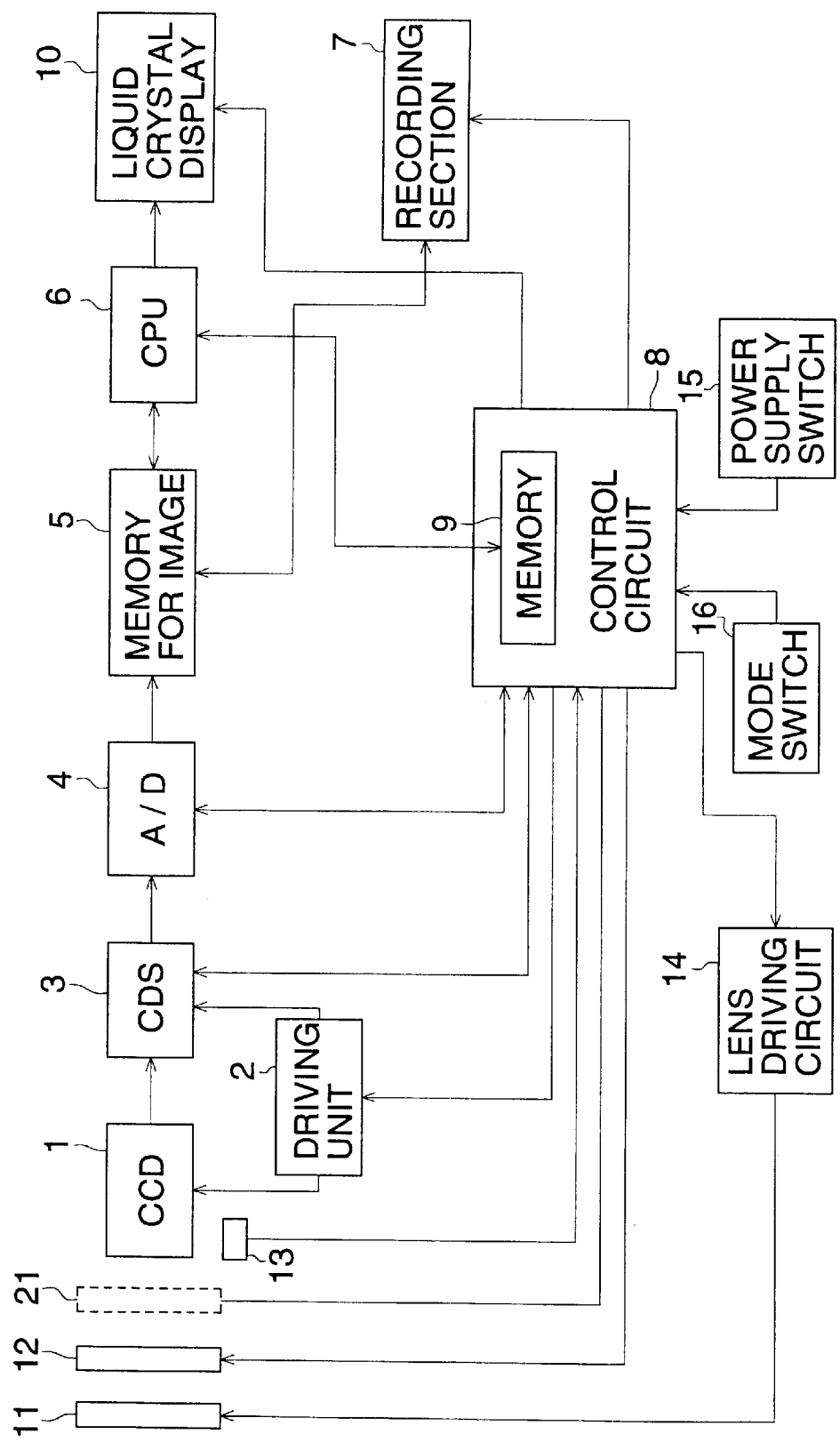
FIG. 1 is a system block diagram showing a digital still camera in an embodiment of the invention.

FIG. 1 shows the structure of a digital still camera as an example of an electronic camera.

In FIG. 1, CCD (Charge Coupled Device) representing a solid image pickup element is one which photoelectrically transfers formed optical images, and driving circuit 2 is a circuit which generates transfer pulses and supplies them to CCD1. Then the CCD1 outputs analog electric image signals based on the transfer pulses.

CDS (Correlative Double Sampling) circuit 3 is a circuit for reducing noises which is driven based on drive pulses outputted from the drive circuit 2.

A/D conversion circuit 4 converts analog signals into digital signals. Incidentally, it is assumed that the higher the luminance level is, the greater the value of digital signals converted is.

Image data of each pixel of the CCD1 obtained through the A/D conversion circuit 4 are stored momentarily in memory for image 5.

Image data stored in the memory for image 5 are subjected to various image processing operations by CPU 6, and are finally stored in storage section 7 which is composed of a recording medium such as a memory card or a magneto-optical disk.

The various image processing operations mentioned above include a processing operation for correcting image data of defective pixels in the CCD1. As will be stated later, the CPU 6 is arranged so that it detects the defective pixels and stores positional information (coordinates) of the defective pixels in memory 9 provided in control circuit 8. In the correction processing for the image data of the defective pixels, the positional information is read out of the memory 9 so that the correction may be made. Incidentally, various data used for detection of the defective pixels are also stored in the memory 9.

Liquid crystal display device 10 is one which displays images formed through an image pickup operation and necessary operation information.

On the front side of the CCD1, there are provided lens 11, aperture 12 which adjusts a quantity of light, and temperature sensor 13 which detects temperature of the CCD1, and signals obtained through detection of the temperature sensor 13 are inputted in the control circuit 8.

Further, there is provided a range-finding means (not shown) which measures the distance to a subject, and the control circuit 8 drives lens drive circuit 14 based on the signal from the range-finding means to move lens 11 to the focusing position.

There are further provided power supply switch 15 and mode switch 16 (mode selecting means) which is for selecting the mode to detect pixel defects, and these switch signals are inputted in the control circuit 8.

Next, detecting operations of the defective pixels will be explained.

First, as the defective pixel, there will be explained detection of white flaws which output signals of high luminance level (white) independently of images.

The detection of the white flaws is carried out for each turning on of power supply in a manner stated below.

After switch 15 is turned on, switch signal thereof is inputted in the control circuit 8 which then controls aperture 12 (light quantity adjusting means) to be opened fully, and a dark image is photographed under the aforesaid condition by CCD1 in quantity equivalent to one image plane (control means).

Output of the CCD1 which the photographed dark image (image for detecting pixel defects) is accumulated in memory for image 5, and CPU 6 compares a threshold value (reference image data) for judging white flaws stored in memory 9 in advance with image data of each pixel, respectively.

Since the dark image is photographed as stated above, when a pixel of CCD1 is normal, image data thereof is less than the threshold value stated above, but when the pixel has a defect representing white flaws, the value of the image data is equal to or higher than the threshold value, whereby the defective pixels (white flaws) are detected (pixel defect detecting means).

When the defective pixels (white flaws) are detected, positional information (coordinates) of the defective pixels is stored in memory 9 (storing means) of the control circuit 8.

In the structure stated above, detection of white flaws is conducted automatically each time the power supply switch is turned on, and the positional information of the latest white flaws is stored in the memory 9, thereby it is possible to conduct correction which corresponds to changes with time of white flaws.

Incidentally, since the white flaws show the tendency to increase with temperature rise, it is also possible to employ the structure wherein when the temperature of CCD1 detected by the temperature sensor 13 arrives at or exceeds the prescribed reference temperature, the dark image is photographed so that the detection of white flaws may be conducted automatically. When the structure mentioned above is employed, changes of increase in white flaws caused by temperature fluctuation can be detected surely and appropriate corrections can be carried out.

Further, in addition to the aforesaid method wherein detection of white flaws is conducted automatically with triggers such as turning on of the power supply and temperature rise, it is also possible to employ a method wherein when a mode for detecting defective pixels is selected by the mode switch 16, detection of white flaws by means of photographing of the dark image is conducted and thereby the white flaws are detected at any time.

The detection of white flaws based on the mode switch 16 may either be conducted immediately after the selection of the mode for detecting defective pixels made by the mode switch 16 with that selection serving as a trigger, or be conducted when the mode for the detection has been selected and the shutter is pressed.

Further, in the case of the structure wherein white flaws are detected only when the mode is selected by the mode switch 16, it is also possible to employ a method wherein the liquid crystal display device 10 displays a warning which urges operations for detecting defective pixels at the timing such as, monthly, semiannually, or yearly, for example, so that white flaws may be detected periodically.

It is further possible to employ the structure wherein automatic detection of white flaws carried out with a trigger of turning on of the power supply is periodically conducted at the timing such as, monthly, semiannually, or yearly, for example, without being conducted every time.

Next, there will be explained detection of black flaws wherein signals of low luminance level (black) are outputted as defective pixels independently of images.

Since the black flaws show a pixel which outputs signals of low luminance level (black) independently of images as stated above, the black flaws can be detected as a pixel whose image data are extremely low, when an image (image for detecting pixel defects) having luminance at a certain level or higher and having a few changes is photographed.

Therefore, for detection of black flaws, it is necessary to photograph while directing a camera toward a bright and flat wall, or an exclusive subject (test chart or the like), thus, a mode to detect defective pixels is selected by mode switch 16 and a shutter is pressed while a camera is directed to the subject mentioned above.

The results of photographing carried out through shutter operations under the condition of selection of the aforesaid detection mode are processed as image data for detection of black flaws. To be concrete, in the same way as in the detection of while flaws, CPU 6 compares a threshold value (reference image data) for judging black flaws stored in memory 9 in advance with image data of each pixel stored in memory for image 5, respectively.

When a pixel of CCD1 is normal, image data thereof is not less than the threshold value stated above, but when the pixel has a defect representing black flaws, the value of the image data is less than the threshold value, whereby the defective pixels (black flaws) are detected.

When the defective pixels (black flaws) are detected, positional information (coordinates) of the defective pixels is stored in memory 9 of the control circuit 8.

In the structure to detect black flaws in the aforesaid way, it is possible to conduct correction of image data, corresponding to changes with time for black flaws.

Incidentally, it is also possible to conduct defocus control (control to shift the focus forcibly from the focused position) in the course of photographing for detecting the black flaws. In this way, fine flaws or shadows of a subject are vignetted, and it is possible to avoid that pixel defects affected by the fine flaws and shades are detected erroneously, and thereby an allowable range of the subject which can be used for detection of black flaws is broadened.

In the case of black flaws, if a subject is flat, image data of a pixel corresponding to black flaws fall extremely, compared with image data of peripheral pixels, thereby the detection can be conducted at considerably high accuracy. Therefore, a mean value of image data for one image plane can be made to be a threshold value (reference image data) for black flaws.

Since it is difficult to make a user photograph surely an image suitable for detecting black flaws in the detection of black flaws, it is also possible to arrange, in the case of photographing for detecting black flaws (when a detecting mode is selected), so that diffusion plate 21 is located between aperture 12 and CCD1 as shown with broken lines in FIG. 1, and light is diffused by the diffusion plate 21 to be uniform light, and is projected on CCD1. In the aforesaid structure, it is possible to detect black flaws even when a subject is photographed without being selected in particular.

Further, when luminance of the image photographed for detecting black flaws is too low, or the image is complicated, it is also possible to issue a warning by discriminating the foregoing so that photographing is conducted again.

Incidentally, the reference data stored in memory 9 in advance and used as a threshold value for judgment in the example stated above can also be obtained from a mean value of peripheral data of a pixel to be detected, by the use of image data obtained after image pickup.

How to obtain the reference data will be explained as follows with reference to drawings. First, let it be considered that color filters respectively for four colors shown in FIG. 2 are arranged for each pixel. FIG. 3 is a diagram showing the state wherein these color filters are arranged two-dimensionally, and color A only is shown for easier understanding.

In FIG. 3, let is be assumed that reference data are calculated by using data of 24 pixels each having the same color (color A) around targeted pixel AA in the area of 9 pixels square. First, a mean value of data of 24 pixels is obtained. This mean value is assumed to be the first reference data for the pixel. A difference between data of the targeted pixel and the first reference data is obtained by comparing them, and this difference is assumed to be the flaw level. When the flaw level exceeds a prescribed range, it is recognized as a flaw, and its positional information is stored in a memory. With regard to other colors (B, C and D), the same processing is conducted. Further, all pixels are subjected to the same processing.

With regard to a flaw level to be detected at this time, a different reference may also be used for detection for each divided area by dividing the whole area without using the same range for all image data. For example, it is possible to divide into an image plane central portion and a peripheral portion, and to change the condition for detecting flaws, such as 5% for the central portion and 10% for the peripheral portion. Percentage in this case is a ratio of flaw level of the targeted pixel to the mean value of data of 24 peripheral pixels.

When plural monochromatic filters are used as a color filter, all pixels adjoining the targeted pixel can be utilized, which is the same as the case of a black and white image sensor. FIG. 4 is a diagram showing this example. For example, all portions B surrounding targeted pixel BB can be utilized. With regard to calculation, it is possible to obtain a mean value of data of the peripheral pixels and to assume this mean value to be the first reference data.

Next, correction of defective pixels will be explained as follows.

Positional information of (coordinates) of defective pixels (white flaws, black flaws) detected and then stored in the memory 9 as stated above is read out in the course of normal photographing, and image data corresponding to the defective pixels are corrected (pixel defect correcting means).

When there are outputted signals which are relatively low in terms of degree of their defects and are relatively close to normal signals, the correction of image data can be conducted through addition and subtraction of a correction value or through multiplication and division of a correction item, concerning image data of defective pixels. However, it is preferable to replace with image data of adjoining pixels, because the level of signals to be outputted regularly in defective pixels is generally close to the level of signals of adjoining pixels.

The replacement with image data of the adjoining pixels can be conducted in the following way.

Namely, as shown in FIG. 5, when image data of pixel A n, n representing the defective pixel are corrected under the condition that color mosaic filters provided on CCD1 are color filters respectively for four colors of A, B, C and D (for example, Ye, Cy, G and Mg), either one of the following values is used for replacement.

$$A\ n,\ n = (A\ n-2,\ n-2 + A\ n-2,\ n+A\ n-2,\ n+2 + A\ n,\ n-2 + A\ n,\ n+2 + A\ n+2,\ n-2 + A\ n+2,\ n + A\ n+2,\ n+2)/8 \quad (1)$$

$$A\ n,\ n = (A\ n-2,\ n + A\ n,\ n-2 + A\ n,\ n+2 + A\ n+2,\ n)/4 \quad (2)$$

$$A\ n,\ n = (A\ n,\ n-2 + A\ n,\ n+2)/2\ \text{or}\ (A\ n-2,\ n + A n+2,\ n)/2 \quad (3)$$

A pattern represented by (1) above is one wherein image data of a defective pixel are replaced with a mean value of image data of 8 pixels each being provided with a color filter of the same color as that for the defective pixel in a 5×5 pixels area where the defective pixel is centered.

A pattern represented by (2) above is one wherein image data of a defective pixel are replaced with a mean value of image data of 4 pixels which are provided respectively with color filters of the same color as that for the defective pixel and are in the same column and the same line as those for the defective pixel in a 5×5 pixels area where the defective pixel is centered.

Further, a pattern represented by (3) above is one wherein image data of a defective pixel are replaced with a mean value of 2 pixels in the same column as that for the defective pixel, or with a mean value of 2 pixels in the same line as that for the defective pixel, both in the pattern of (2) above.

Incidentally, the replacement mentioned above can also be applied similarly to filter colors of B, C and D other than color A.

As shown in FIG. 6, when pixels for filter color B and filter color C are defective pixels in the case that the aforesaid color mosaic filters are those respectively for three colors of A, B and C (for example, R, G and B), data for replacement can be calculated with either one of the aforesaid patterns (1)–(3), while when pixel A n, n is corrected, it is possible to make either one of the aforesaid patterns (1)–(3) to calculate data for replacement, and further to replace with the following values.

$$A\ n,\ n = (A\ n-1,\ n-1+A\ n-1,\ n+1+A\ n+1,\ n-1+A\ n+1,\ n+1)/4 \quad (4)$$

$$A\ n,\ n = (A\ n-2,\ n-2+A\ n-2,\ n+A\ n-2,\ n+2+A\ n-1,\ n-1+A\ n-1,\\ n+1+A\ n,\ n-2+A\ n,\ n+2+A\ n+1,\ n-1+A\ n+1,\ n+1+A\ n+2,\\ n-2+A\ n+2,\ n+A\ n+2,\ n+2)/12 \quad (5)$$

For the replacement by Expression (4), a mean value of image data of 4 pixels at four corners each of which is provided with a color filter with color A which is the same as that for the defective pixel in a 3×3 pixels area where the defective pixel is centered is to be used. For the replacement by Expression (5), a mean value of image data of 12 pixels each of which is provided with a color filter with color A which is the same as that for the defective pixel in a 5×5 pixels area where the defective pixel is centered is to be used.

Figures 7A, 7B, 7C:
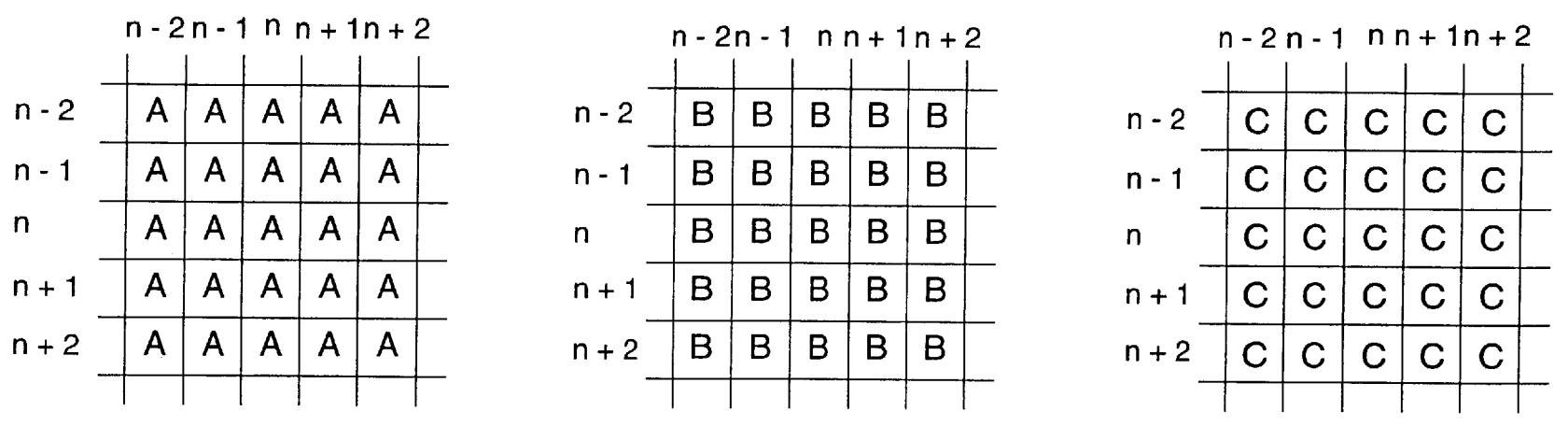

When a CCD of a 3-plate type is used as shown in FIG. 7, color filters for A, B and C (for example, R, G and B) are provided on each CCD. Therefore, when correcting image data of pixel A n, n representing the defective pixel, either of the following values is used for the replacement.

$$A\ n,\ n = (A\ n-1,\ n-1+A\ n-1,\ n+A\ n-1,\ n+1+An,\ n-1+A\ n,\ n+1+A\\ n+1,\ n-1+A\ n+1,\ n+A\ n+1,\ n+1)/8 \quad (6)$$

$$A\ n,\ n = (A\ n-1,\ n-1+A\ n-1,\ n+1+A\ n+1,\ n-1+A\ n+1,\ n+1)/4 \quad (7)$$

$$A\ n,\ n = (A\ n-1,\ n+A\ n,\ n-1+A\ n,\ n+1+A\ n+1,\ n)/4 \quad (8)$$

$$A\ n,\ n = (A\ n-1,\ n+A\ n+1,\ n)/2 \quad (9)$$

$$A\ n,\ n = (A\ n,\ n-1+A\ n,\ n+1)/2 \quad (10)$$

$$A\ n,\ n = (A\ n,\ n-1+A\ n+1,\ n+1)/2 \quad (11)$$

$$A\ n,\ n = (A\ n-1,\ n+1+A\ n+1,\ n-1)/2 \quad (12)$$

For the replacement by Expression (5), a mean value of image data of 8 pixels adjoining the defective pixel is to be used.

For the replacement by Expression (7), a mean value of image data of 4 pixels at four corners in a 3×3 pixels area where the defective pixel is centered is to be used.

For the replacement by Expression (8), a mean value of image data of 4 pixels located up-and-down and right and left adjoining the defective pixel is to be used.

For the replacement by Expression (9), a mean value of image data of 2 pixels located up-and-down adjoining the defective pixel is to be used.

For the replacement by Expression (10), a mean value of image data of 2 pixels located right and left adjoining the defective pixel is to be used.

For the replacement by Expression (11), a mean value of image data of 2 pixels located at upper left and lower right adjoining the defective pixel is to be used.

For the replacement by Expression (12), a mean value of image data of 2 pixels located at upper right and lower left adjoining the defective pixel is to be used.

Providing that the structure is one wherein image data of the defective pixel are corrected as stated above, it is possible to obtain excellent image quality even when a CCD having little defective pixels such as white flaws or black flaws is not used, which makes it possible to raise the yield rate of CCDs finally and thereby to lower the cost thereof.

In the structure wherein a CCD is inspected individually to obtain positional information of the defective pixel which is stored in ROM, both CCD and ROM should always be handled as a pair, which is troublesome. However, if detection of the defective pixel can be conducted under the condition of a camera wherein a CCD is incorporated, it is not necessary to handle both CCD and ROM as a pair, which makes it possible to reduce cost considerably, including the cost of ROM itself and the cost for mounting it.

Next, the second embodiment of detection of a defective pixel will be explained as follows.

In the second embodiment, it is assumed that the detection mode is selected by the mode switch 16, and under this condition, photographing is conducted while a camera is directed to a bright and flat wall or the like, which is the same as in the detection of black flaws in the first embodiment.

In the second embodiment, however, when the mode for detecting the defective pixel is selected by mode switch 16, control circuit 8 controls an aperture and/or shutter speed so that the results of photographing the image for detecting pixel defects (bright and flat wall or the like) may be within a certain luminance range.

For example, when assuming that a pixel size of CCD1 is 640×480 in the structure wherein output of CCD1 is subjected to A/D conversion with 10 bits, an aperture and/or shutter speed is controlled so that a mean value of image data of central pixel area (for example, 128×128) may be within a range of 850–1000.

By controlling an aperture and/or shutter speed as stated above, it is possible to make the contrast between image data of the defective pixel (including white flaws and black flaws) and peripheral pixels to be great sufficiently despite dispersion of subjects, and thereby to improve accuracy for detecting a defective pixel.

Image data obtained through image pickup after luminance adjustment and accumulated in memory for image 5 as stated above are divided into 300 blocks each containing 32×32 pixels, and they are transferred to CPU 6 block by block.

In the CPU 6, a mean value for each filter color of color mosaic filters is obtained with regard to image data (image data for 32×32 pixels) for one block transferred.

Then, contrast C of a targeted pixel to the mean value is calculated as follows from image dataxof the targeted pixel established in the block and mean value $X_{\_avg}$ of the same filter color as that for the targeted pixel.

$$C = |1.0 - |x - X_{\_avg}|/X_{\_avg}| \times 100$$

Then, the contrast C is compared with a prescribed threshold value (10 in the present embodiment), and when C is equal to or greater than 10 (C≧10), the targeted pixel at that time is detected to be the primary suspect for the defective pixel (white flaws, black flaws). Such detection of the primary suspect pixel is conducted for all pixels in the block, changing the targeted pixels in succession.

With regard to the pixel detected as the primary suspect, a mean value of image data of pixels each being provided with a filter of the same color as that of the suspect pixel is obtained within the prescribed pixel area (for example, 13×13 pixels area) where the primary suspect pixel is centered, and absolute value D of a difference between the mean value and image data of the primary suspect pixel is calculated.

Then, the absolute value D of the difference is compared with a prescribed threshold value (50 in the present embodiment), and when the absolute value D satisfies $D \geq 50$, the primary suspect pixel is made to be the secondary suspect pixel, but when C is smaller than 50 ($C \geq 50$), the pixel detected as the primary suspect pixel is judged not to come under the defective pixel, and is excluded from the suspects of defective pixels without being made to be the secondary suspect pixel.

When a mean value of each block is used in detection of the primary suspect pixel as stated above, it is not necessary to obtain a mean value for each targeted pixel, and it is possible to detect the primary suspect pixel with less burden of calculation. Further, it is possible to select the suspect pixel accurately by making the processing of selecting the final suspect pixel from the primary suspect pixel to be conducted based on a mean value in the prescribed area where the targeted pixel (primary suspect pixel) is centered. In the aforesaid structure, therefore, defective pixels can be detected highly accurately with less burden of calculation.

The processing stated above is conducted for all of 300 blocks to detect the secondary suspect pixel in each block. Then, the same subject (image for detecting pixel defects) is subjected to image pickup three times, and the pixel detected as the secondary suspect pixel three times is finally judged to be the defective pixel, and its positional information (coordinates) is stored in the memory.

If the structure is one wherein the pixel detected always as the defective pixel in plural operations of image pickup as stated above is detected as a final defective pixel, it is possible to avoid that an influence of a noise makes the defective pixel to be detected erroneously.

Incidentally, it is possible to avoid an influence of noises and thereby to detect the defective pixel even in the structure wherein the defective pixel is not obtained for each image pickup in plural operations thereof but the defective pixel is detected based on images in which the results of plural operations of image pickup are superposed.

Figure 8:
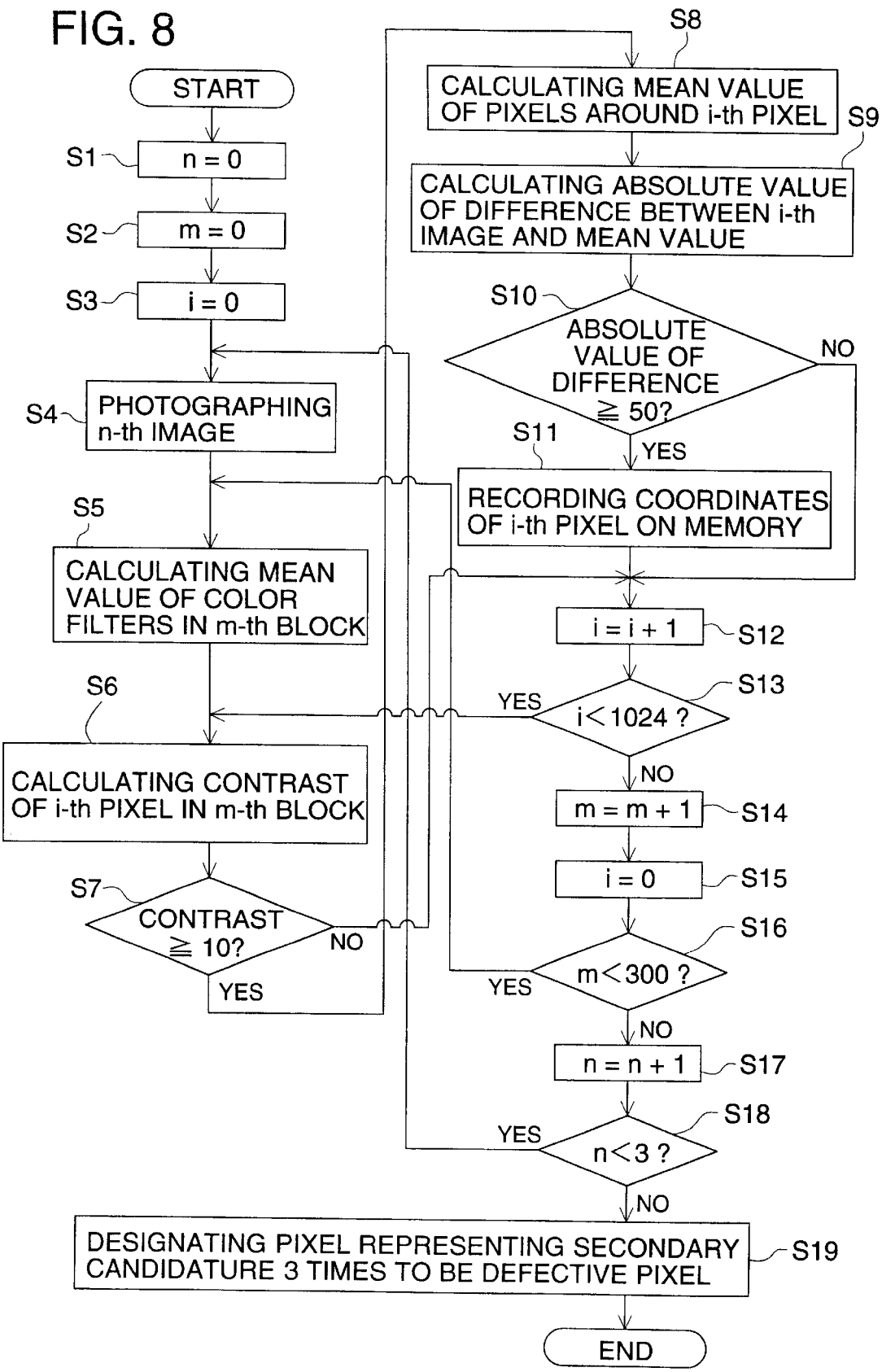
FIG. 8 is a flow chart showing how defective pixels are detected in the second embodiment of the invention.

A flow chart in FIG. 8 shows how the defective pixel is detected, and in S1–S3, number of exposures n, block number m and pixel number in block i are reset to zero respectively.

In S4, n-th photographing is conducted, and in S5, a mean value for each color of a color filter is calculated in m-th block.

In S6, contrast C of i-th pixel in m-th block is calculated based on the mean value calculated in the S5.

In S7, the contrast C obtained through the preceding calculation is judged whether it is not less than the prescribed threshold value (for example, 10) or not.

When the contrast C is not less than the prescribed threshold value (for example, 10), i-th pixel at that time is a primary suspect of the defective pixel, and in that case, the sequence advances to S8 where there is calculated a mean value of image data of pixels each being provided with a filter having the same color as that of i-th pixel among peripheral pixels surrounding the i-th pixel.

In S9, absolute value D of a difference between the mean value calculated in S8 and image data of i-th pixel representing the primary suspect is calculated.

In S10, the absolute value D of the difference is judged whether it is not less than the prescribed threshold value (for example, 50) or not, and when D is 50 or more, i-th pixel at that time is detected as a secondary suspect of the defective pixel, then, the sequence advances to S11 where coordinates of that pixel are stored in the memory, and in succeeding S12, the aforesaid i is counted up so that the following pixel may be judged whether it is a defective pixel or not.

On the other hand, when the contrast C is judged, in S7, to be small and thereby not to come under the primary suspect, or when it is judged to be the primary suspect but the difference from the peripheral pixels is judged to be small in S10, i-th pixel at that time is judged not to be the defective pixel, and the sequence advances to S12 through jumping.

Upon counting up of pixel number i, whether all pixels in the block are judged to be a defective pixel or not is judged in S13 based on whether or not the i has been counted up to the greatest value of 1024 or more.

When the i is less than 1024, the sequence advances to S6 so that the following pixel in the same block may be judged.

On the other hand, when i is not less than 1024, this means that all pixels in the block have been judged whether they come under a defective pixel or not. Therefore, for detecting defective pixels from pixels in the succeeding block, the sequence advances to S14 where the m is counted up, and in S15, the i is reset to zero.

In S16, the m which has been counted up is judged whether it is the greatest number of blocks of 300 or more or not, and when it is less than 300, the sequence advances to S5 where the defective pixel shown with the counted m in the block is detected.

On the other hand, when the m is not less than 300, this means that defective pixels have been detected for all blocks. Therefore, the sequence advances to S17 so that the number of exposures n is counted up.

In the succeeding S18, the n thus counted up is judged whether it is a prescribed number or it is 3 or more, and if it is less than 3, the sequence advances to S4 so that succeeding photographing may be conducted to detect defective pixels.

When the n is 3 or more, on the other hand, this means that photographing has been conducted three times as planned. Therefore, the sequence advances to S19 where the pixel detected as a defective pixel always in three occurrences of photographing is detected, and this pixel is specified as a final defective pixel and its positional information (coordinates) is stored in the memory.

On the other hand, when correcting image data of the defective pixel detected as stated above, image data of a prescribed area which surrounds the defective pixel are transferred from image memory 5 to CPU 6, and image data of the defective pixel are replaced with a mean value of image data of the pixels surrounding the defective pixel and being provided with filters of the same color, which is the same as in the first embodiment.

Next, the third embodiment wherein defective pixels to be corrected are determined in accordance with exposure time will be explained as follows.

Figure 9:
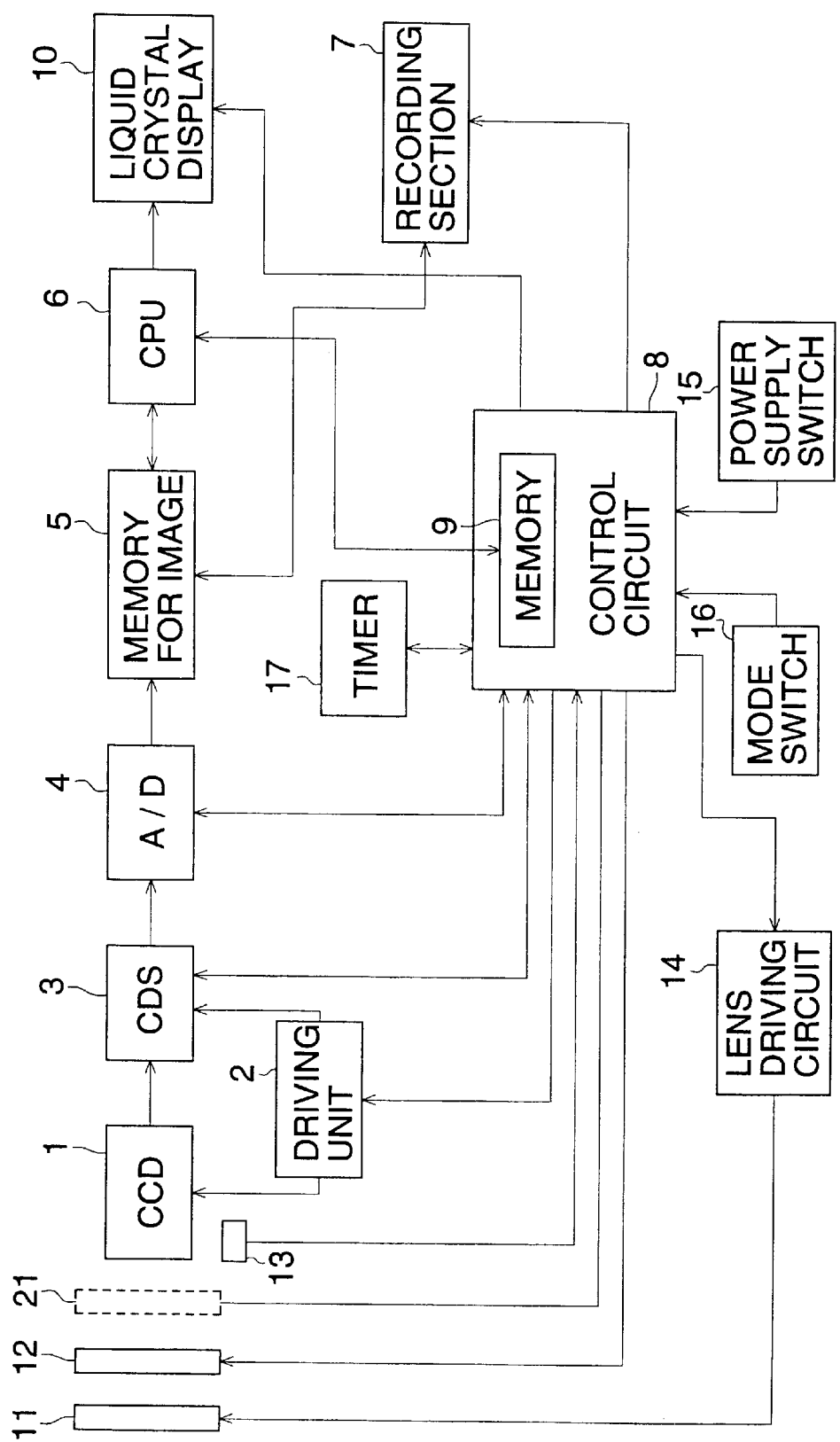
FIG. 9 is a diagram showing the structure of a digital still camera serving as an electronic camera related to the third embodiment.

FIG. 9 is a structural diagram of an electronic camera related to the present embodiment, and timer 17 is connected to control circuit 8, which is different from an electronic camera in FIG. 1. This timer 17 is arranged so that it detects exposure time in image pickup by CCD1 and then outputs signals corresponding to the detected exposure time to control circuit 8.

White flaws are pixel defects that electric charges in a certain quantity are added to electric charges caused by a quantity of light of incident light to be accumulated in a pixel, and they show a tendency that longer exposure time causes more quantity of electric charges accumulated. Therefore, the pixel which is not defective in the case of short exposure time occasionally has white flaws which lower image quality. The pixel of this kind is problematic in terms of handling thereof when correcting output signals of a solid image pickup element. The problem of this kind will be explained more concretely.

Figure 10:
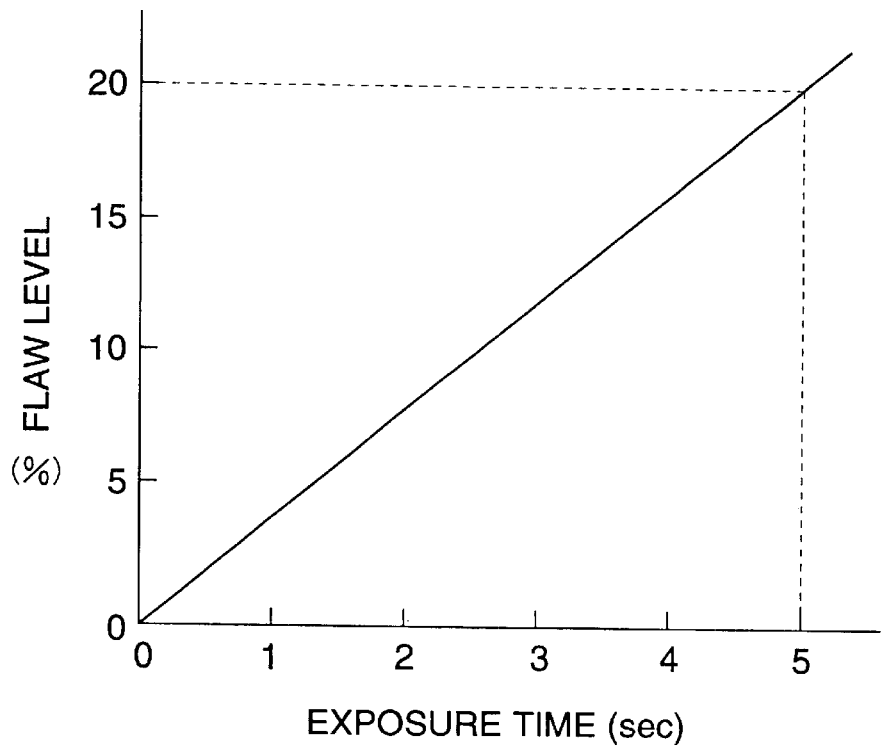
FIG. 10 is a graph wherein an amount of electric charges (flaw level) accumulated independently of a quantity of light of an incident light in a certain pixel is obtained together with exposure time.

FIG. 10 is a diagram which shows the relation between a quantity of electric charges (flaw level) accumulated in a pixel in the case of exposure made in the dark and the exposure time, both obtained simultaneously. For example, let it be assumed that when 20% or more of electric charges are accumulated in the pixel mentioned above, the portion of that accumulation of electric charges can be recognized by a user as a white flaw on the reproduced image. In that case, if exposure time is less than 5 seconds in the actual image pickup, output signals of such pixel do not need to be corrected. If exposure time is 5 seconds or more in the actual image pickup, on the other hand, it is necessary to correct output signals of such pixel and thereby to secure image quality of reproduced images.

Figure 11:
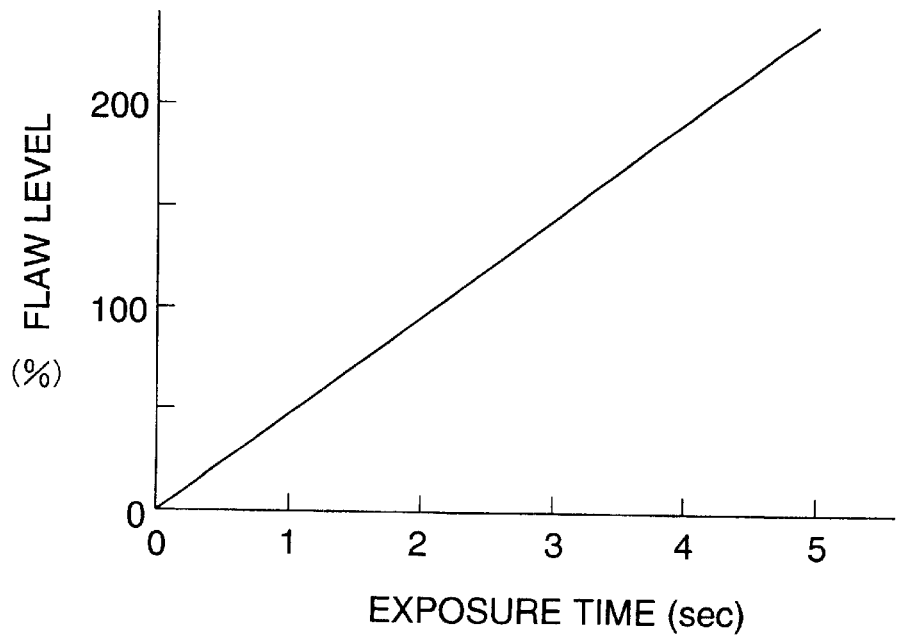
FIG. 11 is a graph wherein the number of pixels whose output signals need to be corrected in certain CCD is obtained together with exposure time.

FIG. 11 is a diagram which shows the relation between the number of pixels whose output signals need to be corrected in a certain CCD and the exposure time, both obtained simultaneously. FIG. 11 shows that when exposure time is 1 second, the number of pixels which need correction is 50, but when exposure time is 4 seconds, the number of pixels to be corrected is increased to 200. As shown above, defective pixels whose output signals need to be corrected have a tendency that they increase as exposure time is made longer. Incidentally, diagrams in FIGS. 10 and 11 just show an example, and some pixels may show characteristics which are different from the diagrams in FIGS. 10 and 11, depending on their types.

In the present embodiment, white flaws which increase when exposure time is made longer or when temperature is raised are corrected in accordance with the exposure time or the temperature to make image quality to be harmonized with processing time. For such correction, a position of a pixel interfering with white flaws, exposure time or temperature are obtained in advance as parameters prior to image pickup of a subject. An embodiment for obtaining the position of the pixel will be explained as follows with an example of exposure time.

First, in inspection conducted before factory shipments or image pickup of a subject, when power supply switch 15 is turned on under the condition that mode switch 16 of a digital camera having the structure shown in FIG. 9 is turned on, switch signals are inputted in control circuit 8. The control circuit 8 controls aperture 12 (quantity of light adjusting means) to be closed completely, then drives an unillustrated shutter under the condition that incident light is restricted to make CCD1 to be subjected to image pickup of dark image for plural image planes while changing exposure time.

Further, output signals of CCD1 which has been subjected to image pickup of the dark image (image for detecting pixel defects) are accumulated in memory for image 5. CPU 6 compares threshold value for judging white flaws (for example, 20% of total amount accumulated) stored in memory 9 in advance with output signal of each pixel for each exposure time. The CPU 6 further detects a position (two-dimensional coordinates) of a defective pixel which outputs signals exceeding the threshold value for each exposure time, and stores it in memory 9 (storing means) of the control circuit 8. Examples of data of defective pixels to be stored are shown in Table 1. For each exposure time, positional information of defective pixels (1-1, 1-10, etc.) are stored. In the present example, information of a defective pixel is obtained for each of of ⅛, 1, 2, and 4 seconds. Even in the case of temperature, information of a defective pixel in the same way.

TABLE 1

| Exposure time | Defective pixel (position) | | | | | |
|---|---|---|---|---|---|---|
| 1/8 | 1–1 | 1–10 | 100–1 | | | ... |
| 1 | 1–1 | 1–10 | 5–10 | 100–1 | 100–2 | ... |
| 2 | 1–1 | 1–10 | 5–10 | 6–10 | 100–1 | ... |
| 4 | 1–1 | 1–7 | 1–10 | 3–5 | 5–10 | ... |

Incidentally, if the inspection stated above is conducted each time a power supply switch is turned on, white flaws which increase with aging deterioration can also be intended for correction, and thereby image quality can further be improved. Further, since white flaws have a tendency that dimensional coordinates) as temperature rises, a position (two-dimensional coordinates) of a defective pixel can also be determined with a parameter of an atmospheric temperature measured by the use of temperature sensor 13 in the course of inspection of white flaws.

The position of the defective pixel detected and stored in memory 9 in the aforesaid manner is read out in the course of image pickup of an actual subject and is used for correction processing of output signals interfering the image. Its embodiment will be explained as follows.

Figure 12:
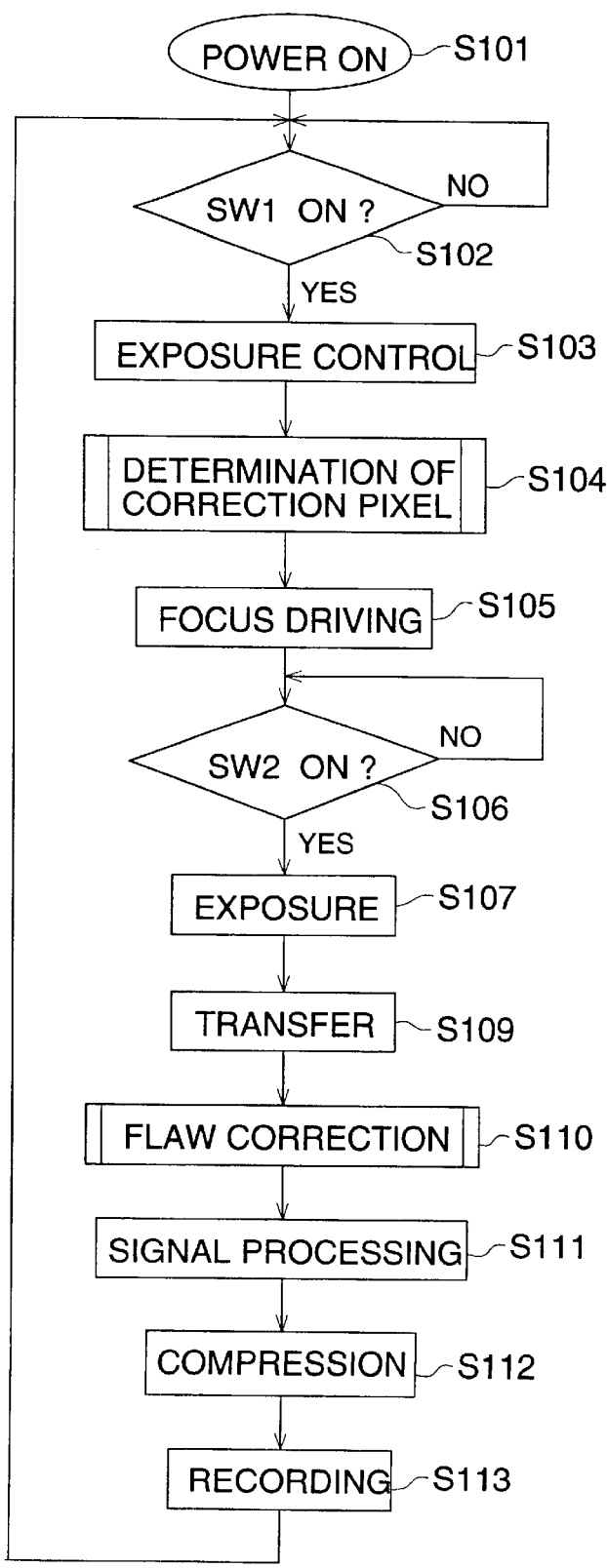
FIG. 12 is a flow chart showing the processing where a subject is photographed actually by an electronic camera related to the present embodiment.
Figure 13:
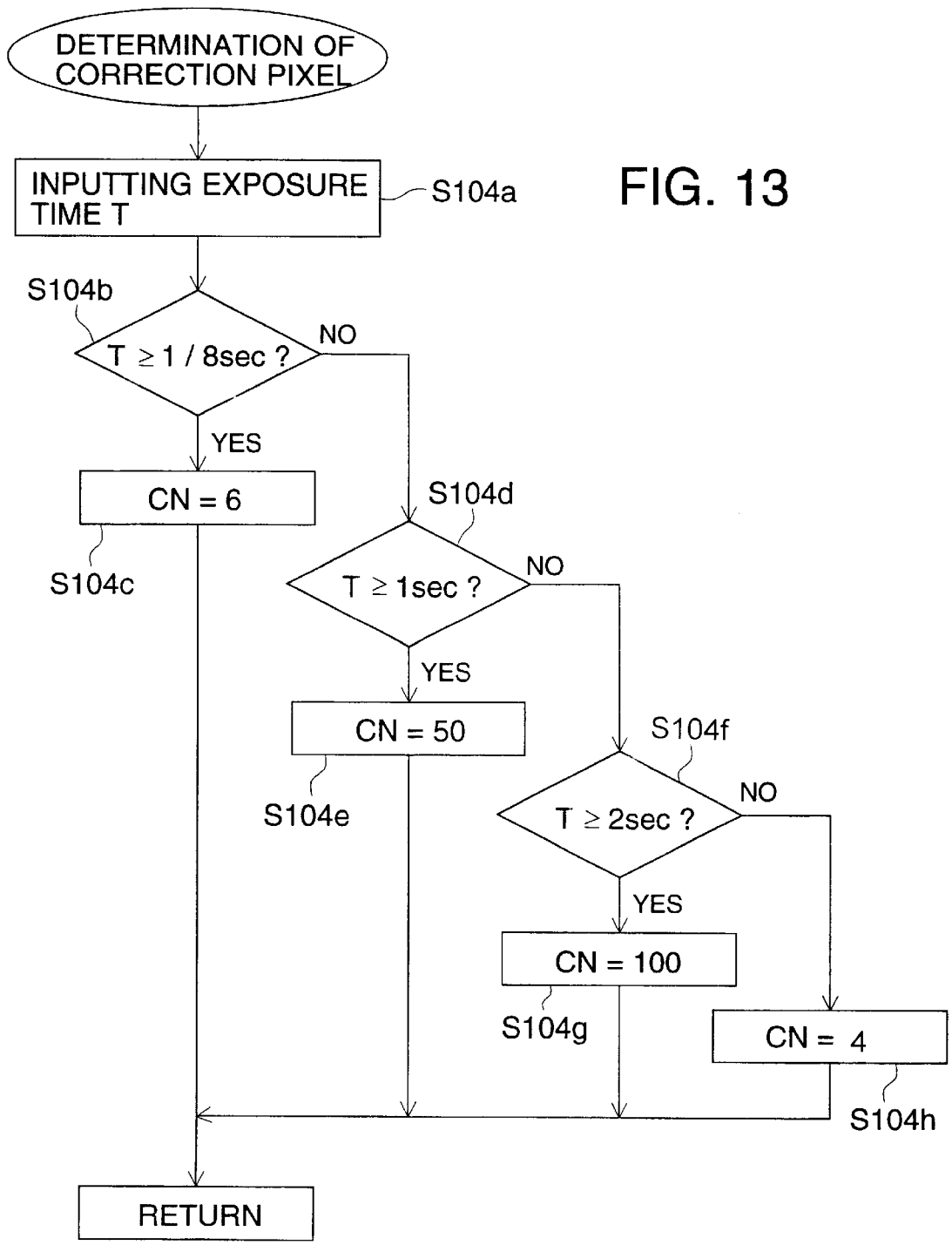
FIG. 13 is a sub-routine which determines pixels that need correction processing.

FIG. 12 is a flow chart showing the processing to conduct image pickup actually by the use of an electronic camera shown in FIG. 9, while FIG. 13 is a subroutine which determines pixels requiring correction processing.

First, in step S101 in FIG. 12, when a user turns power supply switch 15 on (power ON), the flow starts. Incidentally, let it be assumed that switch SW1 is turned on (ON) when a user depresses an unillustrated shutter button partially, and switch SW2 is turned on (ON) when the shutter button is depressed fully.

In step S102, when switch SW1 is not turned on, an electronic camera is kept to be on its standby state, but when the switch SW1 is turned on, exposure control is made by control circuit 8 in succeeding step S103, and exposure time is determined from necessary aperture and shutter speed.

Further, in step S104, there are determined pixels whose output are to be corrected. To be more concrete, in step S104a of subroutine in FIG. 13, the control circuit 8 input exposure time T. This exposure time T may either be a control target value determined in step S103 (FIG. 12) or be actual exposure time obtained through measurement conducted by timer 17 (FIG. 9).

After exposure time T is inputted in the step S104a in FIG. 13, the control circuit 8 judges whether exposure time T is not more than ⅛ seconds or not in step S104b. When judged to be T≦⅛ seconds, the control circuit 8 reads information of pixels requiring correction out of memory 9 in step S104c. On the other hand, when judged not to be T≦⅛ seconds in step S104b, the flow advances to step S104d.

In step S104d, the control circuit 8 judges whether exposure time T is not more than 1 second or not. When judged to be T≦1 second, the control circuit 8 reads information of pixels requiring correction out of memory 9 in step S104e. On the other hand, when judged not to be T≦1 second in step S104d, the flow advances to step S104f.

In step S1-4f, the control circuit 8 judges whether exposure time T is not more than 2 seconds or not. When judged to be T≦2 seconds, the control circuit 8 reads information of pixels requiring correction out of memory 9 in step S104g. On the other hand, when judged not to be T≦2 seconds in step S104f, information of pixels requiring correction is read out of memory 9 (step S104h) because the maximum of exposure time T is 4 seconds in the present embodiment. After that, the flow returns from the subroutine.

Returning to FIG. 12, in succeeding step S105, the control circuit 8 obtains a distance to a subject with an unillustrated range-finding circuit, and drives lens 11 to the focusing position by means of lens drive circuit 14.

In succeeding step S106, when switch SW2 is not turned on (namely, a shutter button is not depressed fully), an electronic camera is kept to be on its standby state, but when the switch SW2 is turned on, the shutter is driven by the control circuit 8 in succeeding step S107, and exposure is made with exposure time T.

After electric charges are accumulated in CCD1 through the aforesaid exposure, the electric charges are transferred in step S109. The electric charges thus transferred are subjected to A/D conversion, and then are stored in memory for image 5 as image data for each pixel.

In step S110, the control circuit 8 conducts correction of white flaws for the electric charges stored in the memory for image 5 based on information of pixels to be corrected stored in memory 9. Incidentally, an embodiment for this correction will be described later. After this correction, the control circuit 8 conducts other signal processing by means of CPU 6 in step S111, and compresses this signal in step S112. The control circuit 8 records images on recording section 7 finally in step S113, and then returns the flow to step S102.

Next, there will be explained an embodiment of correction for white flaws in step S110 stated above. First, the control circuit 8 reads pixels to be corrected which are selected based on exposure time T out of memory 9, and conducts correction processing on an amount of electric charges in image data stored in memory for image 5, the electric charges being corresponding to the pixels to be corrected.

Incidentally, in the correction of image data in the present embodiment, an amount of electric charges of pixels having defects is newly obtained by averaging an amount of electric charges of pixels adjoining the pixel having defects. However, it is also possible to correct image data through addition, subtraction, multiplication and division of a correction value, or through multiplication and division of correction item, for an amount of electric charges from pixels having defects.

First, when the control circuit 8 obtains an amount of electric charges of pixel A n, n representing a defective pixel in the case where color mosaic filters provided on CCD1 in advance are represented by color filters respectively for four colors of A, B, C and D (for example, Ye, Cy, G and Mg) as shown in FIG. 5, calculation is conducted based on either one of the following expressions. Incidentally, symbol A n, n stated later means an amount of electric charges related to filter color A (namely, Ye) of a pixel located at n-th column and n-th line.

$$A\ n,\ n = (A\ n-2,\ n-2 + A\ n-2,\ n+A\ n-2,\ n+2 + A\ n,\ n-2 + A\ n,\ n+2 + A\ n+2,\ n-2 + A\ n+2,\ n + A\ n+2,\ n+2)/8 \quad (1)$$

$$A\ n,\ n = (A\ n-2,\ n+A\ n,\ n-2 + A\ n,\ n+2 + A\ n+2,\ n)/4 \quad (2)$$

$$A\ n,\ n = (A\ n,\ n-2 + A\ n,\ n+2)/2 \text{ or } (A\ n-2,\ n+A\ n+2,\ n)/2 \quad (3)$$

According to an average of the above expression (1), an average value of an amount of electric charges of 8 pixels each being provided with a color filter of the same color as that for the defective pixel replaces an amount of electric charges of the defective pixel in the 5×5 pixels area where the defective pixel is centered. Therefore, changes in the amount of electric charges of that pixel and in the amount of electric charges of the adjoining pixels are made to be natural, and thereby image quality can be improved.

According to an average of the above expression (2), an average value of an amount of electric charges of 4 pixels which are provided respectively with color filters of the same color as that for the defective pixel and are located at the same column and the same line as those for the defective pixel replaces an amount of electric charges of the defective pixel in the 5×5 pixels area where the defective pixel is centered. Therefore, improvement of image quality and improvement of processing speed can be harmonized.

According to an average of the above expression (3), an average value of an amount of electric charges of 2 pixels which are provided respectively with color filters of the same color as that for the defective pixel and are located at the same column or the same line as that for the defective pixel replaces an amount of electric charges of the defective pixel in the 5×5 pixels area where the defective pixel is centered. Therefore, processing speed can be improved. Incidentally, correction processing can similarly be conducted even for filter colors other than A, namely, for B, C and D.

On the other hand, as shown in FIG. 6, even in the case where the color mosaic filters are represented by filters respectively of three colors of A, B and C (for example, R, G and B) and pixels related respectively to filter colors B and C are defective pixels, replacement of an amount of electric charges can be conducted by the use of the expressions (1)–(3). On the other hand, when the pixel related to filter color A is defective pixel, calculation can be carried out based on either one of the following expressions for calculation.

$$A\ n,\ n = (A\ n-1,\ n-1 + A\ n-1,\ n+1 + A\ n+1,\ n+1 + A\ n+1,\ n-1)/4 \quad (4)$$

$$A\ n,\ n = (A\ n-2,\ n-2 + A\ n-2,\ n+A\ n-2,\ n+2 + A\ n-1,\ n-1,\ n+1 + A\ n,\ n-2 + A\ n,\ n+2 + A\ n+1,\ n-1 + A\ n+1,\ n+1 + A\ n+1,\ n+2,\ n+A\ n+2,\ n+2)/12) \quad (5)$$

According to an average of the above expression (2), an average value of an amount of electric charges of 4 pixels at 4 corners which are provided respectively with color filters of the same color A as that for the defective pixel replaces an amount of electric charges of the defective pixel in the 3×3 pixels area where the defective pixel is centered. Therefore, improvement of image quality and improvement of processing speed can be harmonized.

On the other hand, according to an average of the above expression (5), an average value of 12 corners which are provided respectively with color filters of the same color A as that for the defective pixel replaces an amount of electric charges of the defective pixel in the 5×5 pixels area where the defective pixel is centered. Therefore, improvement of image quality can be achieved.

Further, when a CCD of a three-plate type shown in FIG. 7 is used, color filters respectively for A, B and C (for example, R, G and B) are provided on each CCD. Therefore, when correcting an amount of electric charges of pixel A n, n representing a defective pixel, calculation can be carried out based on either one of the following expressions for calculation.

$$A\ n,\ n=(A\ n-1,\ n-1+A\ n-1,\ n+A\ n-1,\ n+1+A\ n,\ n-1+A\ n,\ n+1+A\ n+1,\ n-1+A\ n+1,\ n+A\ n+1,\ n+1)/8 \quad (6)$$

$$A\ n,\ n=(A\ n-1,\ n-1+A\ n-1,\ n+1+A\ n+1,\ n-1+A\ n+1,\ n+1)/4 \quad (7)$$

$$A\ n,\ n=(A\ n-1,\ n+A\ n,\ n-1+A\ n,\ n+1+A\ n+1,\ n)/4 \quad (8)$$

$$A\ n,\ n=(A\ n-1,\ n+A\ n+1,\ n)/2 \quad (9)$$

$$A\ n,\ n=(A\ n,\ n-1+A\ n,\ n+1)/2 \quad (10)$$

$$A\ n,\ n=(A\ n-1,\ n-1+A\ n+1,\ n+1)/2 \quad (11)$$

$$A\ n,\ n=(A\ n-1,\ n+1+A\ n+1,\ n-1)/2 \quad (12)$$

Calculation based on expression (6) is intended to obtain a mean value of an amount of electric charges of 8 pixels adjoining the defective pixel, while calculation based on expression (7) is intended to obtain a mean value of an amount of electric charges of 4 pixels at four corners in the 3×3 pixels area where the defective pixel is centered.

Calculation based on expression (8) is intended to obtain a mean value of an amount of electric charges of 4 pixels which adjoin the defective pixel and are located respectively over, under, on the right and on the left of the defective pixel, while calculation based on expression (9) is intended to obtain a mean value of an amount of electric charges of 2 pixels which adjoin the defective pixel and are located respectively over and under the defective pixel.

Calculation based on expression (10) is intended to obtain a mean value of an amount of electric charges of 2 pixels which adjoin the defective pixel and are located respectively on the right and the left of the defective pixel, calculation based on expression (11) is intended to obtain a mean value of an amount of electric charges of 2 pixels which adjoin the defective pixel and are located respectively at the upper left position and the lower right position of the defective pixel, and calculation based on expression (12) is intended to obtain a mean value of an amount of electric charges of 2 pixels which adjoin the defective pixel and are located respectively at the upper right position and the lower left position of the defective pixel. The expression for calculation can be selected in accordance with required image quality and processing speed.

As stated above, the number of defective pixels is determined, taking exposure time into consideration in the present embodiment. Therefore, when exposure time is short, processing speed can be improved by making the number of defective pixels to be corrected small, while when exposure time is long, image quality can be improved by making the number of defects to be corrected large. Further, in the present embodiment, even the pixel judged to be defective in preceding image pickup wherein exposure time is long can be handled as a normal pixel when exposure time is short, and thereby capacity and functions of CCD can be utilized fully.

Next, the fourth embodiment for detection of defective pixels will be explained as follows.

Figure 14:
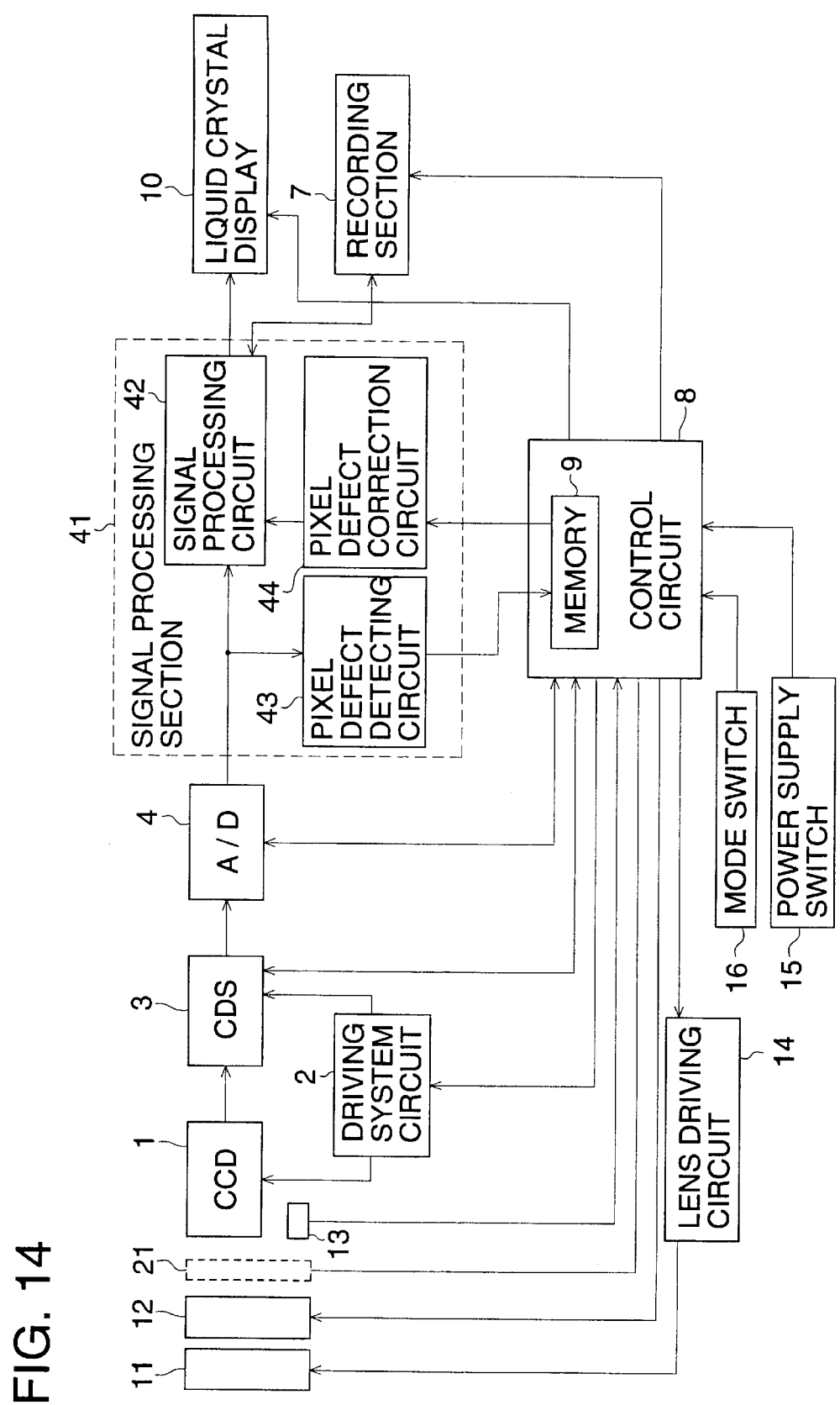
FIG. 14 is a system block diagram showing a digital still camera in the fourth embodiment.

FIG. 14 is a diagram showing the structure of a digital still camera representing an example of an electronic camera. The detection of defective pixels and correction of image data in the defective pixels can also be carried out by the structure shown in FIG. 14, in the same way as in the previous embodiment shown in FIG. 1.

Incidentally, constitutional items in FIG. 14 which are the same as those in FIG. 1 are given the same symbols and explanation thereof will be omitted here.

In FIG. 14, signal processing section 41 into which digital signals obtained through conversion made by A/D converting circuit 4 are inputted is provided with signal processing circuit 42, pixel defect detecting circuit 43 representing a pixel defect detecting means and pixel defect correcting circuit 44. The signal processing circuit 42 is a circuit which conducts luminance processing and color processing, and thereby converts to luminance signals and to digital video signals serving as chrominance signals.

The pixel defect detecting circuit 43 is a circuit which detects defective pixels such as white flaws and black flaws in the same manner as in the above-mentioned embodiment, and positional information (coordinates) of defective pixels detected by the pixel defect detecting circuit 43 is stored in the memory 9.

The pixel defect correcting circuit 44 is a circuit which corrects a signal level of the signal from the defective pixel based on positional information (coordinates) of defective pixels stored in the memory 9, in the same manner as in the previous embodiment, and outputs the results of the correction to the signal processing circuit 42.

FIG. 15 is a diagram showing the structure of a digital still camera representing an example of an electronic camera similar to that in FIG. 14, and detection of defective pixels and correction of image data of the defective pixels can be conducted also by the structure shown in FIG. 15, in the same way as in the previous embodiment in FIG. 9.

What is claimed is:

1. A camera, comprising:
   an image pickup element for converting optical image information into electric signals and for outputting the electric signals as image data;
   a positional information output means for outputting positional information of a defective pixel;
   a memory in which the positional information is stored;
   a focus controlling means for controlling a focus; and
   a defocus control means for controlling said focus controlling means so that a focus is deviated for defocusing from the focused position,
   wherein said image pickup element converts optical image information when the focus is deviated from the focused position by the defocus control means into electric signals, and outputs them as defocused image data, and, thereafter, the positional information output means compares said defocused image data or data based on said defocused image data with a first reference data and outputs the positional information of a defective pixel having image data which satisfies a prescribed condition as a result of the comparison.

2. The camera according to claim 1, further comprising:
   an image processing means for conducting image processing to replace image data of the pixel whose positional information is stored in the memory with a mean value of image data of pixels corresponding to color filters having the same color as that of the aforesaid color filter corresponding to the pixel whose positional information is stored among peripheral pixels surrounding the aforesaid pixel.

3. The camera according to claim 1, further comprising:
   a contrast calculating means for calculating contrast of a targeted pixel based on image data of the targeted pixel representing the pixel whose positional information is stored and of peripheral pixels surrounding said targeted pixel, wherein the positional information output means compares the contrast pixel representing the data based on said image data with the first reference data, and outputs positional information of a pixel having image data which satisfy the prescribed condition.

4. The camera according to claim 1, wherein the image pickup element outputs a plurality of image data per one pixel and the positional information output means compares data based on the plural image data with the first reference data and outputs positional information of a pixel having image data which satisfy the prescribed condition.

5. The camera according to claim 1, wherein the positional information output means compares image data outputted by the image pickup element in synchronization with switching of a power supply switch of the camera from OFF to ON or data based on the image data with the first reference data and outputs positional information of a pixel having image data which satisfy the prescribed condition.

6. The camera according to claim 1, further comprising:

a timer to output output signals at prescribed intervals, wherein the positional information output means compares image data outputted by the image pickup element in synchronization with the output signals or data based on the image data with the first reference data, and outputs positional information of a pixel having image data which satisfy the prescribed condition.

7. The camera according to claim 1, further comprising:

a targeted pixel extracting means for comparing the image data or data based on the image data with the first reference data, and extracting the image data which satisfy a prescribed condition after the comparison as a targeted pixel;

a difference calculating means for calculating a difference between the image data or data based on the image data of the targeted pixel and a mean value of image data or data based on image data of peripheral pixels surrounding the targeted pixel;

a positional information output means for comparing the difference representing the data based on the image data with a second reference data and for outputting positional information of a pixel having image data which satisfy the prescribed condition; and an image processing means for conducting image processing on image data of the pixel whose positional information is stored in the memory.

8. The camera according to claim 7, wherein said image processing is a processing to replace image data of the pixel whose positional information is stored in the memory with image data of pixels adjoining the aforesaid pixel.

9. The camera according to claim 1, further comprising:

a defective pixel detection commanding means for inputting a command for starting detection of defective pixels; and a defective pixel detection signal outputting means for outputting defective pixel detection signals for making the output of the positional information to be started to the positional information output means in synchronization with the input of commands conducted by the defective pixel detection commanding means.

* * * * *